(12) United States Patent
Dunki et al.

(10) Patent No.: US 8,117,219 B2
(45) Date of Patent: *Feb. 14, 2012

(54) GENERATION OF UPDATABLE ANONYMIZED DATA RECORDS FOR TESTING AND DEVELOPING PURPOSES

(75) Inventors: Peter Dunki, Zurich (CH); Christoph Frei, Baden (CH)

(73) Assignee: UBS AG, Zurich (CH)

( * ) Notice: Subject to any disclaimer, the term of this patent is extended or adjusted under 35 U.S.C. 154(b) by 751 days.

This patent is subject to a terminal disclaimer.

(21) Appl. No.: 11/199,285

(22) Filed: Aug. 9, 2005

(65) Prior Publication Data

US 2006/0059189 A1    Mar. 16, 2006

(30) Foreign Application Priority Data

Sep. 15, 2004    (EP) .................................... 04021927

(51) Int. Cl.
G06F 7/00 (2006.01)
G06F 17/30 (2006.01)
G06F 17/00 (2006.01)

(52) U.S. Cl. .................... 707/757; 707/620; 707/634
(58) Field of Classification Search .................. None
See application file for complete search history.

(56) References Cited

U.S. PATENT DOCUMENTS

| | | | | |
|---|---|---|---|---|
| 5,214,703 | A | 5/1993 | Massey et al. | 380/37 |
| 6,275,824 | B1 * | 8/2001 | O'Flaherty et al. | 1/1 |
| 6,502,102 | B1 * | 12/2002 | Haswell et al. | 707/102 |
| 6,951,013 | B1 * | 9/2005 | Lozins | 717/125 |
| 7,409,388 | B2 * | 8/2008 | Dunki et al. | 717/124 |
| 7,480,898 | B2 * | 1/2009 | Batten et al. | 717/124 |
| 2002/0010679 | A1 * | 1/2002 | Felsher | 705/51 |
| 2003/0039362 | A1 | 2/2003 | Califano et al. | |
| 2003/0097359 | A1 * | 5/2003 | Ruediger | 707/6 |
| 2003/0115212 | A1 * | 6/2003 | Hornibrook et al. | 707/103 R |

(Continued)

FOREIGN PATENT DOCUMENTS

EP    1950684 A1 *    7/2008

(Continued)

OTHER PUBLICATIONS

Reiss: Brown University: Practical Data-Swapping: The First Steps: Mar. 1984, pp. 20-37: ACM Transactions on Database Systems, vol. 9, No. 1.*

(Continued)

Primary Examiner — Rehana Perveen
Assistant Examiner — Raheem Hoffler

(57) ABSTRACT

A mechanism is described for the computer-aided generation of anonymized data records for developing and testing application programs that are intended for use in a productive network (12). A method according to the invention comprises the provision of at least one productive database (14) containing data records that contain productive data elements to be anonymized, provision of at least one non-productive database (22) containing data records that likewise contain data elements, the generation of an assignment between data records of the non-productive database (22) and data records of the productive database (14), and also the generation of an anonymized data record by replacing the data elements to be anonymized in a data record from the productive database (14) with the data elements of an assigned data record from the non-productive database (22). The assignment is maintained during a later generation of new anonymized data records and/or during an updating of already generated anonymized data records in order to be able to maintain the test data and in order to make simpler error analysis possible.

13 Claims, 5 Drawing Sheets

U.S. PATENT DOCUMENTS

| | | | |
|---|---|---|---|
| 2004/0078238 A1* | 4/2004 | Thomas et al. .................... | 705/3 |
| 2004/0254894 A1* | 12/2004 | Tsuei et al. ...................... | 705/74 |
| 2005/0086250 A1* | 4/2005 | Richardson ................... | 707/102 |
| 2005/0198074 A1* | 9/2005 | Khayter et al. ............ | 707/104.1 |
| 2005/0283667 A1* | 12/2005 | Batten et al. .................... | 714/25 |
| 2006/0059148 A1* | 3/2006 | Dunki et al. ...................... | 707/6 |

FOREIGN PATENT DOCUMENTS

| | | |
|---|---|---|
| WO | WO 91/18459 | 11/1991 |

OTHER PUBLICATIONS

Steven P. Reiss: "Practical data-swapping: the first steps" ACM Transactions on Database Systems, vol. 9, No. 1, Mar. 1984, pp. 20-37, XP002313203.

Strategies to Improve Application Testing 'Online! Jan. 2004, Princeton Softech, Princeton, NJ, White Paper, Jan. 2004, pp. 1-16, XP002313205 URL:http://www.princetonsoftech.com/library/rt/TestStrategiesWP-a4.pdf European Search Report Deated Feb. 1, 2005.

Papotto, L., article entitled "Test Data Management Part 1—Application Readiness", pp. 1-4, published by Princeton Softech, Inc., 2004.

Papotto, L., article entitled "Test Data Management Part 2—Data Privacy and Techniques for De-Identifying Test Data", pp. 1-4, published by Princeton Softech, Inc., 2004.

Papotto, L., article entitled "Test Data Management Part 3—Automated Testing" pp. 1-2, published by Princeton Softech, Inc., May 2004.

European Office Action Dated Mar. 1, 2007.

* cited by examiner

GENERATION OF UPDATABLE ANONYMIZED DATA RECORDS FOR TESTING AND DEVELOPING PURPOSES

FIELD OF THE INVENTION

The invention relates to the field of data anonymization. Stated more precisely, the invention relates to the generation of anonymized data records for the development and testing of computer applications (hereinafter referred to as applications).

BACKGROUND OF THE INVENTION

The development and testing of new applications requires the presence of data that can be processed by the new applications in trial runs. In order to be able to attribute a reliable information content to the results of the trial runs, it is essential that the data processed in the trial runs are equivalent in a technical respect (for example, as concerns the data format) to those data that are to be processed by the new applications subsequent to the development and test phase. For this reason, within the framework of the trial runs, those application data are frequently used that were generated by the currently productive (predecessor) versions of the applications to be developed or to be tested. These data, hereinafter referred to as productive application data or simply as productive data, are normally stored in databases in the form of data records.

The use of productive application data for development and test purposes is in practice not without problems. Thus, it has emerged that the data spaces accessible by the developers on the basis of their respective authorization in the productive environment are frequently not large enough to obtain reliable results. The results of trial runs also vary from developer to developer on the basis of their individual-specific data space authorizations. The data space authorization of individual persons can indeed be temporarily expanded for the trial runs; this measure is, however, expensive and, in the case of sensitive or confidential data in particular, is not possible without further checks or restrictions.

Another approach in regard to the use of sensitive or confidential productive application data within the framework of trial runs is to perform the trial runs on a compartmentalized and access-protected central test system. However, the technical cost associated with setting up such a central test system is high. In addition, such a procedure does not permit any delivery of data to (decentralized) development and test systems for error analysis.

The above-explained and further disadvantages have led to the insight that the use of productive data for development and test purposes is ruled out in many cases. An alternative to the use of productive data was therefore sought. On the one hand, said alternative should present a realistic copy of the productive data in regard to the data format, the data content, etc. On the other hand, the additional technical precautions, in particular as concerns the protection against unauthorized access (authorization mechanisms, fire walls, etc.) should be capable of being kept to a minimum as far as possible.

It has emerged that the above-cited requirements are fulfilled by test data that are generated by a partial anonymization (or masking) of productive data records. By anonymizing sensitive elements of the productive data, the potential damage that could be anticipated in the event of unauthorized accesses is reduced. This makes it possible to relax the safety mechanisms. In particular, the test data for trial runs and for error analysis can be loaded onto decentralized systems. On the other hand, however, since the technical aspects (data format, etc.) of the productive application data do not have to be altered or have to be altered only slightly by a suitable anonymization mechanism, the anonymized test data form a realistic copy of the productive data.

A data record can be anonymized by erasing the data elements to be anonymized or by overwriting such data elements by a predefined standard text identical for all the data records, while the data elements not to be anonymized are retained unaltered. Such a procedure leads to anonymized data records without (substantial) changes arising in the data format. It has, however, become apparent that trial runs using such anonymized data records do not reveal all the weak points in the application to be developed or to be tested and frequently errors still occur during initial use of the application in the productive environment.

The occurrence of errors in the productive environment, which are to be ascribed, as a rule, to defective programming of the application, is proof that the anonymized data used in the trial runs in the development and testing environment do not (yet) correspond to a sufficient degree to the productive data. However, programming errors occur more frequently in the development and testing environment than in the productive environment. This fact therefore requires the existence of effective error analysis mechanisms.

The object underlying the invention is to provide an efficient approach to the provision of anonymized test data. For the abovementioned reasons, the test data are intended to be as faithful a copy as possible of the productive data and, in addition, permit a reliable error analysis. In total, the information content of trial runs is to be improved using the anonymized test data and the failure probability of newly developed or further developed applications in the productive environment is to be optimized.

SUMMARY OF THE INVENTION

In accordance with a first aspect of the invention, this object is achieved by a test data anonymization method that generates anonymized data records for developing and testing application programs that are intended for use in a productive environment. The method comprises the steps of providing at least one productive database containing data records that contain productive data elements to be anonymized, providing at least one non-productive database containing data records that likewise contain data elements, generating an assignment between data records of the non-productive database and data records of the productive database and the generation of anonymized data records by replacing data elements in the data records to be anonymized from the productive database with data elements from respectively assigned data records from the non-productive database, the assignment, once generated, being maintained in a (for example, later) generation of new anonymized data records or in an updating of the already generated anonymized data records.

In most cases, the maintenance of the assignment facilitates the error analysis and furthermore permits an individual updating of anonymized data records already generated. The updating of anonymized data records ties up, as a rule, fewer resources than the generation of completely new anonymized data records. Furthermore, the updating approach ensures that current test data are always available in the development and test environment. Such maintenance of the anonymized data records allows them to be continuously adapted to the productive data records.

The data records may be assigned in such a way that a subsequent determination of the data element or data record in the productive database assigned to the anonymized data element or data record is possible. This approach furthers error analysis since, for example, it is possible to determine whether the errors occurring in trial runs are to be attributable to the fact that defective data were already being employed in the productive environment.

The assignment between individual data records in the non-productive database and corresponding data records in the productive database may take place within the productive environment. The productive environment may comprise a productive computer network containing a plurality of network components. In such a case, it is conceivable to grant only those network components (or users employing them) access to the assignment that have a suitable authorization in the productive environment.

In parallel with the productive environment, a non-productive environment may be provided, for example, as development and test environment in the form of a computer network. The non-productive environment may comprise a test database containing the anonymized data records. In addition to or as an alternative to the test database, the non-productive environment may comprise the non-productive database. Expediently, there is no access to the assignment from the non-productive environment. In other words, within the non-productive environment, it is then no longer possible to infer a certain productive data record from the content of an anonymized data record (and/or of a non-productive data record).

The mutual assignment of data records from the productive and from the non-productive database may take place in a very wide variety of ways. The assignment may, for example, be based on a deterministic mechanism, for instance a cryptographic method or an assignment table. If an assignment table is used, it may be generated on a random basis. Consequently, while the assignment table is a deterministic scheme, the individual assignments within the assignment table may be determined.

According to the invention, it is unnecessary for every productive data record also to have a non-productive data record as counterpart. Thus, the number of non-productive data records may be smaller than the number of productive data records. Expediently, however, precisely one non-productive data record is assigned in each case at least to the productive data records to be anonymized.

As already explained, the anonymized data records may be maintained by an updating mechanism. Thus, for example, provision can be made that the anonymized data records are updated at regular time intervals. In addition to or as an alternative to this, a user-controlled updating may also take place.

The approach of combining data elements from the productive database with data elements from the non-productive database to generate an anonymized data record makes it possible for the non-productive database to contain copies of data records and/or data elements of the productive database. This procedure simplifies the creation of the non-productive database. Especially in combination with an assignment scheme ensuring an adequate anonymization between productive and non-productive databases, an adequately high anonymization is ensured for many purposes.

The non-productive database may contain exclusively or at least partly data records having data elements different from the productive data elements. In practice, it has been found that an adequate anonymization is in any case still ensured if the proportion of data records containing data elements different from the productive data elements in the non-productive database is at least 5%. Preferably, this proportion is 10% or more.

The data elements different from the productive data elements in the non-productive database may be drawn from a publicly accessible electronic database or file. Depending on type, format and comprehensible content of the data elements to be anonymized (and as a function of the application to be developed or to be tested), various publicly accessible electronic databases or files are suitable for this purpose. For example, electronic telephone books or other electronic lists of names and/or lists of addresses have proved suitable.

Identifiers can be assigned in each case to the individual data elements of data records of the productive database and of data records of the non-productive database. The provision of identifiers makes it possible to replace the productive data elements to be anonymized by data elements from the non-productive database having corresponding identifiers.

The data elements contained in the non-productive database may have at least partly a meaning that can be comprehended by a user. Thus, said data elements may be (at least, partly) texts, designations, names, address details, etc.). In accordance with one embodiment of the present invention, the data elements contained in the productive and/or those contained in the non-productive database contain name data and/or address data.

The anonymization approach according to the invention yields anonymized data records that are suitable for developing and testing application programs. Said application programs may be programs that comprise processing steps that require a regular updating of the data to be processed.

The invention may be implemented as software or as hardware or as a combination of these two aspects. Thus, in accordance with a further aspect according to the invention, a computer program product containing program code means for performing the method according to the invention is provided when the computer program product is executed on one or more computers. The computer program product may be stored on a computer-readable data medium.

In accordance with a hardware aspect of the invention, a computer system is provided for generating anonymized data records for developing and testing application programs that are intended for use in a productive environment. The computer system comprises at least one productive database containing data records that contain productive data elements to be anonymized, at least one non-productive database containing data records that likewise contain data elements, and a programmed computer for generating anonymized data records, an assignment between data records in the non-productive database and data records in the productive database existing that is maintained during the generation of new anonymized data records or during an updating of already generated anonymized data records, and the computer generating an anonymized data record by replacing the data elements to be anonymized in a data record from the productive database by the data elements of an assigned data record from the non-productive database. The computer system may furthermore comprise a test database in which the anonymized data records are stored.

SUMMARY OF THE DRAWINGS

Further advantages and configurations of the invention are explained in greater detail below with reference to preferred embodiments and to the accompanying drawings. In the drawings.

DESCRIPTION OF PREFERRED EMBODIMENTS

The invention is explained in greater detail below by reference to preferred embodiments. Although one of the embodiments explained is focused on the generation of anonymized data records containing realistic address images, it is pointed out that the invention is not restricted to this field of application. The invention may, for example, be used anywhere where applications are to be tested reliably and with an efficient error analysis mechanism.

Figure 1:
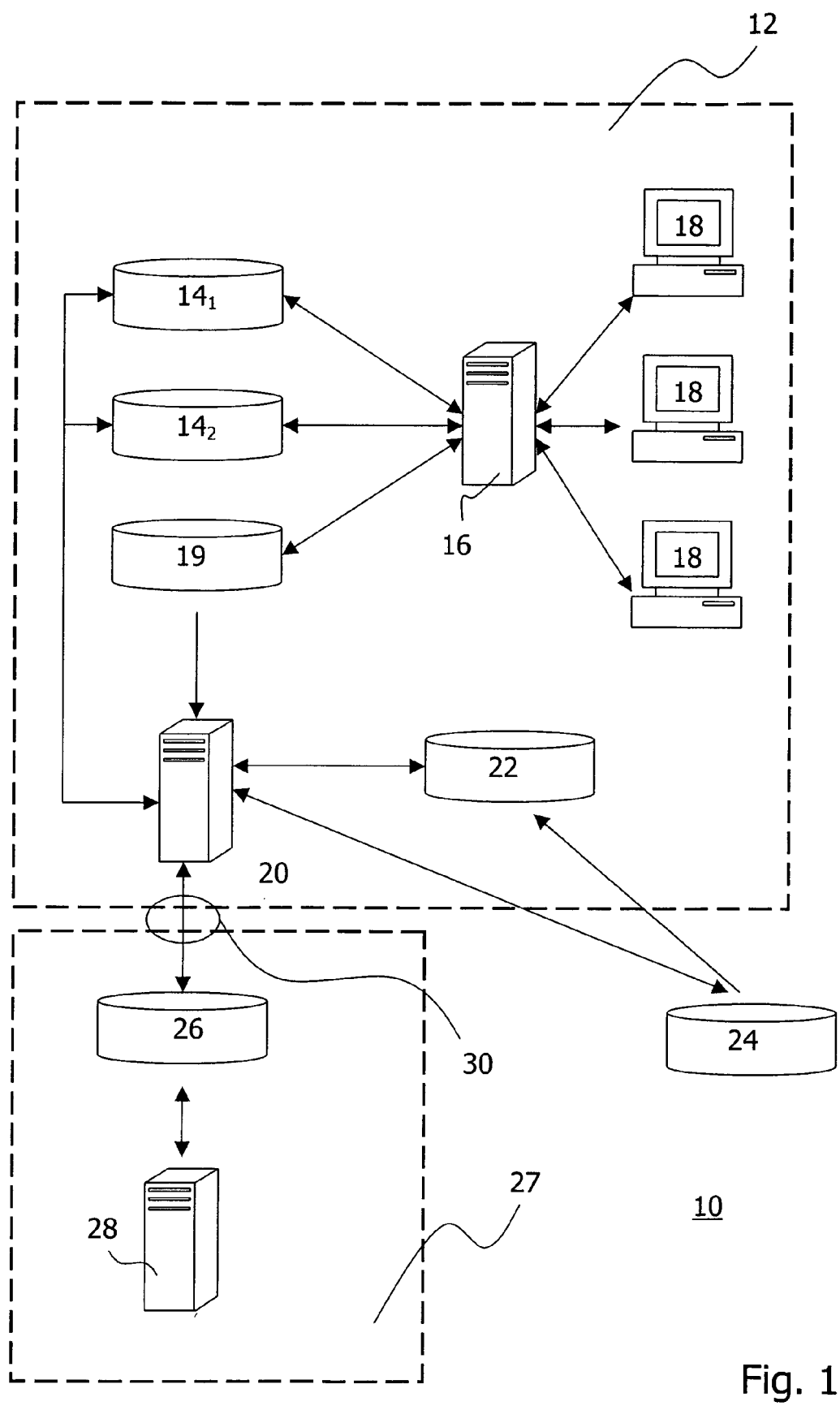
FIG. 1 shows an embodiment of a computer system according to the invention for generating anonymized data records.

FIG. 1 shows an exemplary embodiment of a computer system 10 according to the invention for generating anonymized data records for developing and testing application programs. In the various embodiments, corresponding elements and components are provided in each case with corresponding reference symbols.

In accordance with the embodiment shown in FIG. 1, the computer system 10 comprises a productive computer network 12 involving a plurality of productive databases 14, at least one application server 16 and also a multiplicity of computer terminals 18. Running on the application server 16 is a plurality of application programs whose services the application server 16 makes available to the computer terminals 18 in the productive network 12. As database server, the application server 16 makes possible, in addition, access to the (productive) data records contained in the productive databases 14. The logically related data elements (or data) of such a data record may be distributed over a plurality of productive databases 14. Thus, static data elements of the productive data records may be stored and maintained in a first productive database $14_1$ and non-static data elements of the productive data records may be stored and maintained in a second productive database $14_2$. The productive network 12 and, in particular, the productive databases 14 are protected by a series of security mechanisms against unauthorized accesses. The security mechanisms comprise authentication concepts and user-dependent data space authorizations.

In the productive network 12, use is made of the application programs running on the application server 16 in accordance with the functionalities they are intended to provide. This means that productive application data are constantly transferred between the application server 16 and the productive databases 14, on the one hand, and the application server 16 and the computer terminals 18, on the other. Said productive data have, accordingly, an intended purpose defined by the application programs running on the application server 16. Thus, the application programs may be machine controls, address-based applications (for example, for generating printed matter), components of an ERP (enterprise resource planning) system, a CAD (computer aided design) program, etc. The actual intended purpose of the application data does not affect the scope of this invention.

Furthermore, there is present in the productive network 12 an assignment component 19 that is indicated in the embodiment in accordance with FIG. 1 as a database and whose function is described more precisely below. Depending on the assignment mechanism provided, the assignment component 19 may also be designed as a file, as a cryptographic program routine, etc. Given a suitable authorization, the assignment component 19 can be accessed by some of the computer terminals 18 via the application server 16.

In the exemplary case shown in FIG. 1, the computer system 10 furthermore comprises an anonymization computer 20, disposed within the productive network 12, that has access to the assignment component 19 and also to three further databases, namely to a non-productive database 22 containing, for example, historicized productive data records (still disposed in the productive network 12 for reasons of access control), a publicly accessible electronic database 24 containing public data records and also at least one test database 26 containing anonymized data records. The anonymization computer 20 has reading access to the productive databases 14, the assignment component 19 and the publicly accessible electronic database 24 as well as write/read access to the historicization database 22 and test database 26.

The functional difference between the productive databases 14 and the non-productive database 22 is essentially that the contents of the productive databases 14 can (continuously) be manipulated by the application server, whereas the non-productive database 22 is a "data preserve" which is not needed by the application programs running on the application server 16 if they are used in accordance with the functionalities they provide.

The publicly accessible electronic database 24 and the test database 26 are located outside the productive network 12 in FIG. 1. More strictly speaking, the test database 26 is disposed inside a development and test environment in the form of a computer network 27. An interface 30 permits a transfer of anonymized data records from the productive network 12 to the test database 26 and, consequently, to the network 27. In its structure, the network 27 resembles the productive network 12 and comprises an application server 28 for development and test purposes. The application server 28 has access to the test database 26. The test database 26 may be structured similarly to the productive databases 14. In order to enable an optimum testing of new or improved applications, the database 26 may have an identical structure to the productive databases 14. This may require splitting up the database 26 into individual, physically separate databases.

Figure 2:
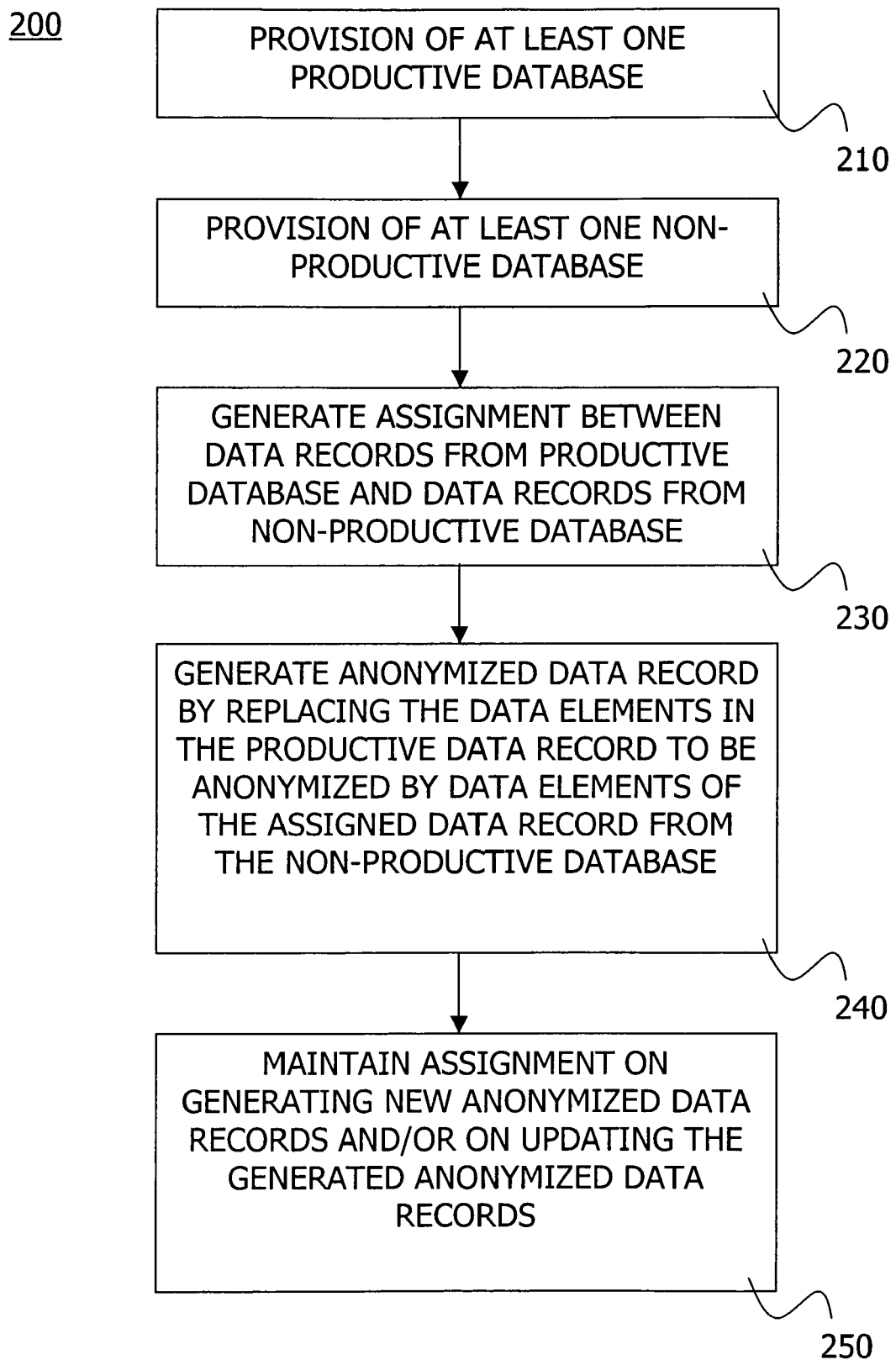
FIG. 2 shows a diagrammatic flowchart of a method according to the invention for generating anonymized data records.

The mode of operation of the computer system 10 shown in FIG. 1 during the generation of anonymized data records in accordance with the anonymization method according to the invention is now explained in greater detail with reference to the flowchart 200 shown in FIG. 2.

The method starts with the provision of the productive databases 14 and also of at least one non-productive database 22 in the steps 210 and 220. The databases 14, 22 contain productive and non-productive data records that each comprise individual data elements. Individual data elements contained in the productive data records are to be anonymized.

In step 230, an assignment is generated between data records from the productive databases 14, on the one hand, and data records from the non-productive database 22, on the other. Various assignment mechanisms suitable for this purpose are explained in greater detail below.

In step 240, the anonymization computer 20 generates an anonymized data record in which the data elements to be anonymized in a productive data record are replaced with data elements of the assigned data record from the non-productive database 22. In a later generation of a new set of anonymized data records and/or during the updating of previously generated anonymized data records, the original assignment is maintained. This is shown in step 250.

Figure 3:
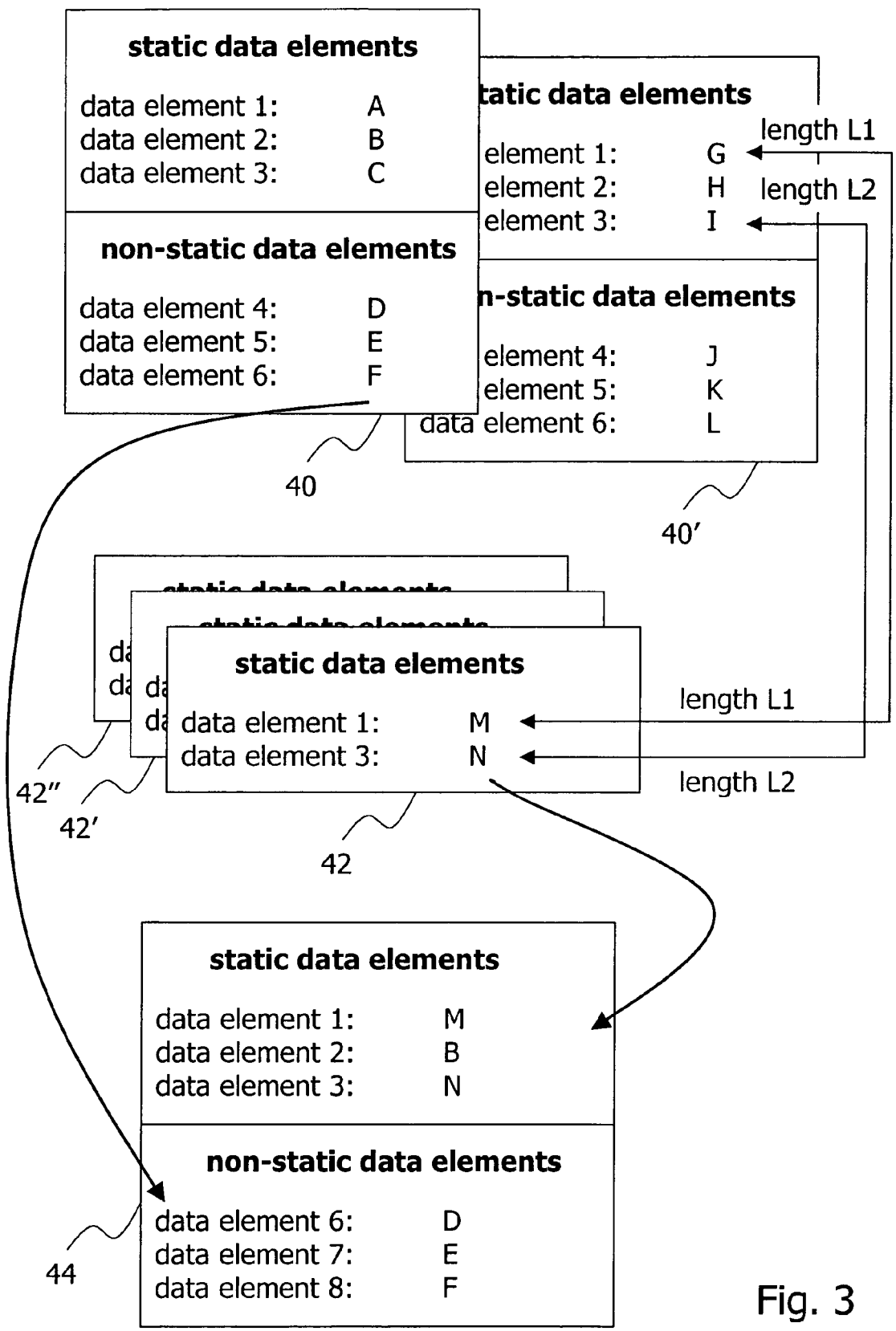
FIG. 3 shows a diagrammatic representation of the generation of anonymized data records in accordance with a first embodiment.

FIG. 3 shows a diagrammatic representation of an exemplary embodiment for the generation of anonymized data records using productive data records 40, 40' contained in the productive databases 14, on the one hand, and non-productive data records 42, 42', 42" contained in the non-productive database 22, on the other.

The data records contained in the non-productive database 22 can be generated in various ways. In accordance with a first variant, all the data records in the non-productive database 22 were obtained by copying public data records (or at least by copying data elements contained therein). In accordance with a second variant, all the non-productive data records were generated by copying or historicizing (withdrawal at a certain instant in time) of productive data records (or at least by copying or historicizing data elements contained therein). In accordance with a third variant, the non-productive database 22 comprises data records that originate, in regard to the data elements contained therein, from the productive databases 14 and the publicly accessible electronic database 24. Non-productive data records containing data elements from the publicly accessible electronic database 24 can consequently be added to non-productive data records containing data elements from the productive databases 14 in order to increase the degree of anonymization. In this way, an uncertainty factor is generated in such a way that, in the development and test environment, the productive data records (and productive data elements) can no longer be unambiguously inferred from an anonymized data record. FIG. 3 shows by way of example two productive data records 40, 40' at the top. Each of said data records 40, 40' comprises a plurality of productive data elements (A, B, C, . . . ) that can be manipulated (generated, altered, erased, etc.) and processed by the application programs running on the application server 16.

The data elements are subdivided in the exemplary case shown in FIG. 3 into static data elements (or master data) and non-static data elements (or transaction data). Non-static data elements are preferably very short-lived data elements that are normally necessary only for the execution of an individual transaction. Typical OLTP (On-Line Transaction Processing) systems are designed to process many thousands or even millions of individual small transactions per day. In any case, in uncondensed form, the non-static data elements are therefore available only for a short time (although, for reasons of being able to reconstruct individual transactions, they are, as a rule, saved in condensed form). Compared to non-static data elements only current in transactions, the static data elements may be markedly longer-lived in terms of time. For this reason, as a rule, many data records contain identical static data elements, but non-static data elements that differ in a transaction-specific way. Despite their long life, the static data elements may also be subject to manipulations, but, compared to the lifetime of typical transaction-specific, non-static data elements, these occur extremely rarely. The static data elements and the non-static data elements of a productive data record may be contained in separate productive databases and linked to one another. This measure makes it possible, for example, to provide tailor-made database concepts and security concepts for the data elements having different lifetimes. It is furthermore conceivable that a plurality of productive data records exists that have identical static data elements but different non-static data elements. In this case, the use of separate databases promotes the redundancy-free storage of static data elements.

The static data elements are accordingly those data that, although they are processed by the application programs, do not have to be manipulated, or at least not frequently. A static data element may, for example, be an event date (for example, a specification of a day or a year), a name, an address specification, a setpoint, etc. On the other hand, the non-static data elements are continuously manipulated by the application programs running on the application server 16 and they therefore form, for example, the input parameters or output parameters of said application programs. In the exemplary embodiment in accordance with FIG. 3, it is assumed that only some of the static data elements of the productive data records are to be anonymized, while the non-static data elements do not require anonymization and are intended to be available unaltered in the development and test environment.

An identifier in the form of a number between 1 and 6 is assigned to each of the individual data elements.

Corresponding identifiers are used both for the productive data records 40, 41 and also for the non-productive records 42, 42', 42". This procedure makes it possible to replace productive data elements to be anonymized by non-productive data elements with a corresponding identifier.

The non-productive data records 42, 42', 42" comprise, in the example in accordance with FIG. 3, only those data elements that are needed to anonymize the productive data records. Since, in the exemplary embodiment in accordance with FIG. 3, only the productive data elements having the identifiers 1 and 3 have to be anonymized, the non-productive data records 42, 42', 42" each contain only data elements having the identifiers 1 and 3 to reduce the memory space requirement. In accordance with a modification of the exemplary embodiment in accordance with FIG. 3, it would, however, be possible for the non-productive data records 42, 42', 42" to have the same format as the above-explained productive data records 40, 40' (i.e. to comprise static and non-static data elements like the productive data records 40, 40'. In that case, only the data elements needed for anonymization purposes (here having the identifiers 1 and 3) would be read out of the non-productive data records and transferred to the respective anonymized data records to be generated.

As emerges from FIG. 3, the non-productive data record 42 corresponds, in regard to the character string lengths of the data elements 1 and 3 contained therein, to the productive data record 40'. In other words, both the data element G having the identifier 1 of the productive data record 40' and the data element M having the identifier 1 of the non-productive data record 42 both have the same character string length L1. Furthermore, both the data element I (identifier 3) of the productive data record 50' and the data element N (identifier 3) of the non-productive data set 42 each have the corresponding length L2. In the non-productive database 22, the data record 42 is, however, not unique in regard to the presence of a data element of the identifier 1 having a length L1 and of the data element 3 having a length L2. On the contrary, in the non-productive database 22 at least one further data record (for example data record 42' and/or data record 42") is present that likewise comprises a data element of the identifier 1 having the length L1 and a data element of the identifier 3 having the length L2.

The generation of an anonymized data record 44 shown in FIG. 3 on the basis of the productive data records 40, 40' and of the non-productive data records 42, 42' and 42" now proceeds as follows. In a first step, there is derived from the productive databases 14 (for example, on the basis of a user-definable selection mechanism) a productive data record that is to be anonymized and transferred to the test database 26 as an anonymized data record. This is shown in FIG. 3 by way of example for the productive data record 40. Here, it is again assumed that the data elements having the identifiers 1 and 3 of the productive data records are to be anonymized. With respect to the data record 40 in accordance with FIG. 3, the data records to be anonymized are therefore the data elements A and C. These two data elements A and C are to be replaced by data elements having corresponding identifiers of the non-productive data records 42, 42' and 42".

A data record from the non-productive database 22 (whose data elements having the identifiers 1 and 3 are to replace the data elements having the corresponding identifiers of the data record 40 extracted from the productive database 14) is now to be assigned in a next step to the productive data record 40. In the exemplary embodiment shown in FIG. 3, the non-productive data record 42 is assigned to the productive data record 40. This assignment takes place using the cryptographic assignment component 19 shown in FIG. 4.

Figure 4:
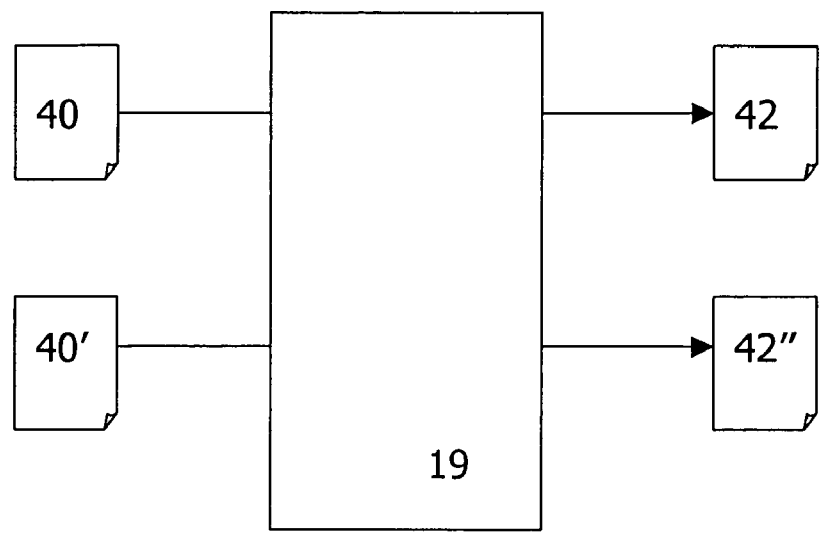
FIG. 4 shows an assignment approach used in the first embodiment.

The assignment component 19 in FIG. 4 is based on a cryptographic mechanism, such as, for example, the IDEA encoding mechanism described in U.S. Pat. No. 5,214,703 or EP 0 482 154. Such a mechanism makes permits the implementation of an assignment component 19 that reproducibly retains an assignment, once defined, between the productive data records 40, 40', etc., and the non-productive data records 42, 42', 42", etc. As is shown in FIG. 4, the component 27 reproducibly assigns the non-productive data record 42 to the productive data record 40. On the other hand, the non-productive data record 42" is reproducibly assigned to the productive data record 40', etc.

The reproducibility of the assignment shown in FIG. 4 makes it possible to update individual anonymized data records in the test database 26. In this way, data modifications in the productive environment can be incorporated in the test database 26. In particular, in accordance with this updating approach, it is not necessary to regenerate the content of the test database 26 completely every time. This reduces the load on existing resources and increases the availability of the productive databases 14.

As is shown in FIG. 3, to generate the anonymized data record 44, the data elements having the identifiers 1 and 3 of the productive data record 40 are replaced by the corresponding data elements of the non-productive data record 42. More strictly speaking, the data element A is replaced by the data element M and the data element C by the data element N in order to anonymize the productive data record 40. The data elements B, D, E and F of the productive data record 40 do not, on the other hand, require any anonymization and are transferred unaltered to the anonymized data record 44. In FIG. 3, the fact that the anonymized data record 44 has the same format as the productive data record 40 can be clearly perceived.

Figure 5:
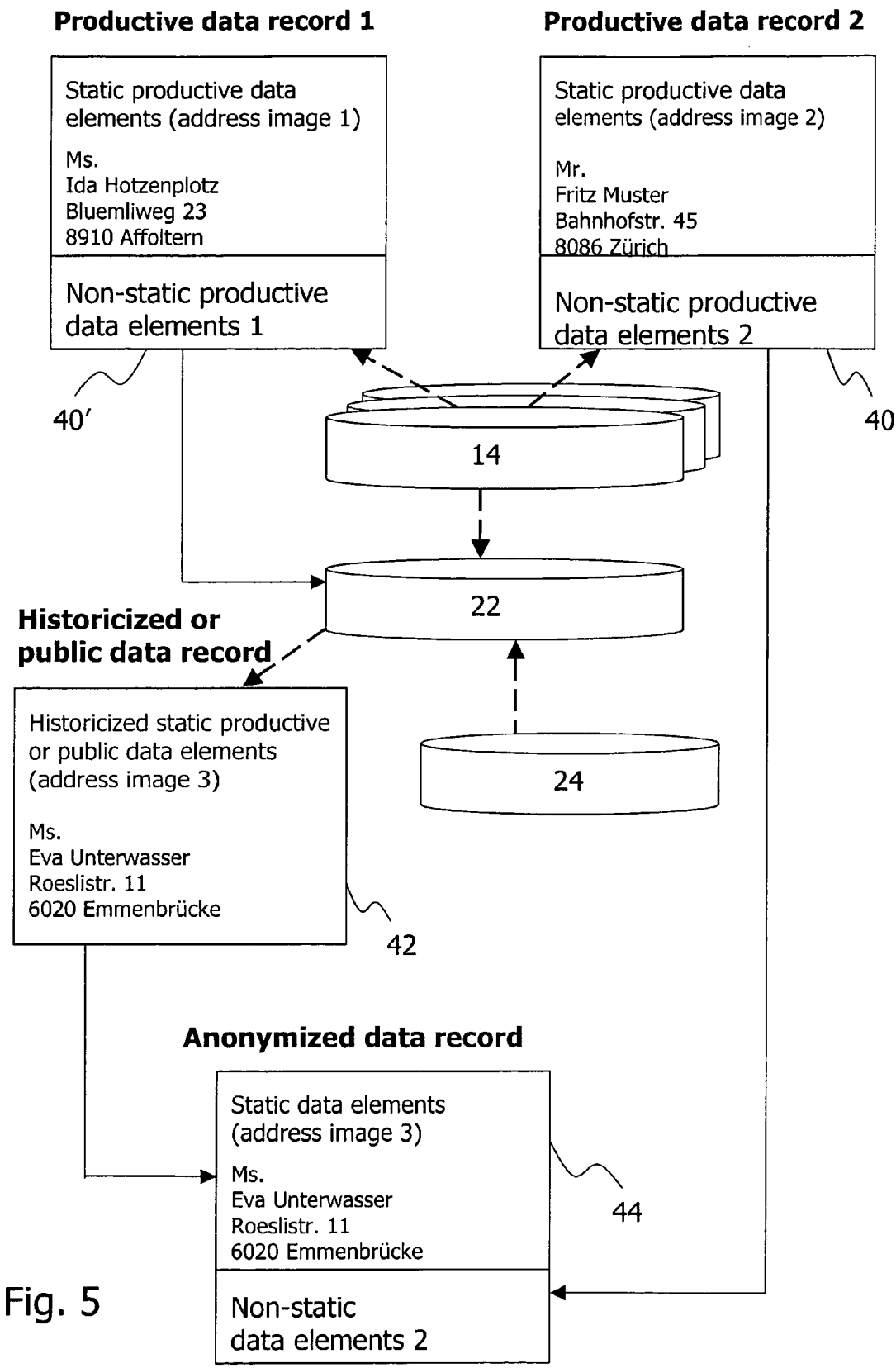
FIG. 5 shows a diagrammatic representation of the generation of anonymized data records in accordance with a second embodiment.

FIG. 5 shows in a diagrammatic representation a further exemplary embodiment for the generation of an anonymized data record by combining data elements of a productive data record with data elements of a non-productive data record.

The exemplary embodiment shown in FIG. 5 relates to the generation of anonymized data records for developing and testing especially those application programs that output the data elements contained in the anonymized data records on a display device or in the form of printed matter. More strictly speaking, anonymized data records are to be made available that permit the development and testing of address-based application programs. Such application programs serve, for instance, to create an addressed statement of account containing non-static productive data (such as account balances, account turnovers, etc.) and static productive data (such as account numbers, name details and address details). In this connection, for example, it is necessary to ensure that all the relevant address details are shown inside a limited window of an envelope. For this reason, there is the requirement that the anonymized address images are, in regard to their geometrical dimensions, a faithful imaging of the productive address images in order to be able to check, for example, the relative position between window and address imprint. Owing to the confidentiality of the non-static productive data (bank secret), however, the productive data records must not be used in creating test statements of account for development and test purposes. On the contrary, the object is to assign anonymized address images to the non-static productive data.

For this purpose, as shown in FIG. 5, a non-productive database 22 containing non-productive data records is again created in a first step. This takes place in such a way that a user-selected selection of the address images (that is to say of the static data elements) contained in the productive databases 14 are transferred to the non-productive database 22 (e.g. historicized). To improve the degree of anonymization, address images are furthermore loaded from the publicly accessible electronic database 24 (for example, from an electronic telephone book) into the non-productive database 22. Approximately 10% of the data records of the non-productive database 22 originate from the publicly accessible electronic database 24.

In accordance with a variant of the exemplary embodiment shown in FIG. 5, only the data elements name and first name are transferred from the productive databases 14 to the non-productive database 22. In the latter, these two data elements are combined with address details (for example, street, town, etc.) that may originate from the publicly accessible electronic database 24. In addition, complete address images (including first name and surname) may also be extracted from the publicly accessible electronic database 24 to generate non-productive data records. This measure is expedient, in particular, if yet further data elements are needed (in addition to the data elements read out of the productive databases 14) to ensure that no data record having an unambiguous character string length combination occurs in the non-productive database 22.

In accordance with the exemplary embodiment shown in FIG. 5, the non-productive data records do not correspond, in regard to their character string length statistics of the data elements first name and surname (assigned data element identifiers are used internally but are not shown in FIG. 5), to productive data records. This implies, for example, that, for the productive address image 1 of the productive data record 40' comprising a three-character first name (Ida) and a surname comprising eleven characters (Hotzenplotz), there is a corresponding non-productive data record 42 containing a non-productive address image that likewise provides a first name comprising three characters (Eva) and a surname comprising eleven characters (Unterwasser). For the anonymized data record 44 to be generated and for development and test purposes, it is irrelevant in this connection whether the data elements of the address image of the non-productive data record 42 originate from the publicly accessible electronic database 26 or, alternatively, they originate from the productive database 14.

Furthermore, the statistical properties of the data records, data elements and of data element segments in the non-productive database 22 are approximated to the greatest possible extent to the statistical properties of the data records, data elements and of data element segments in the productive databases 14. This relates, for example, to the statistical distributions of the character string lengths and also to the statistical distributions of the initial letters at least of the surnames. This measure facilitates the development and testing of application programs that comprise sorting algorithms.

To generate the anonymized data record 44 shown in FIG. 5, a data record is first determined (or derived) from the productive database 14 and also exactly one assigned data record is determined (or derived) from the non-productive database 22. This determination takes place on the basis of the assignment table 19 shown in FIG. 6 and is described in greater detail below.

In the exemplary embodiment in accordance with FIG. 5, the non-productive data record 42 is assigned to the productive data record 40. The non-productive database 42 comprises (at least) one non-productive historicized productive or public address image that, to anonymize the productive data record 40, replaces its productive address image. The anonymized data record 44 to be generated then comprises, in addition to the address image, read out of the non-productive database 22, of the data record 42, the non-static data elements of the productive data record 40. If necessary, individual non-static productive data elements of the productive data record 40 can likewise also be anonymized. The (non-productive) data necessary for this purpose can be extracted from the non-productive data record 42 or generated in another way.

Figure 6:
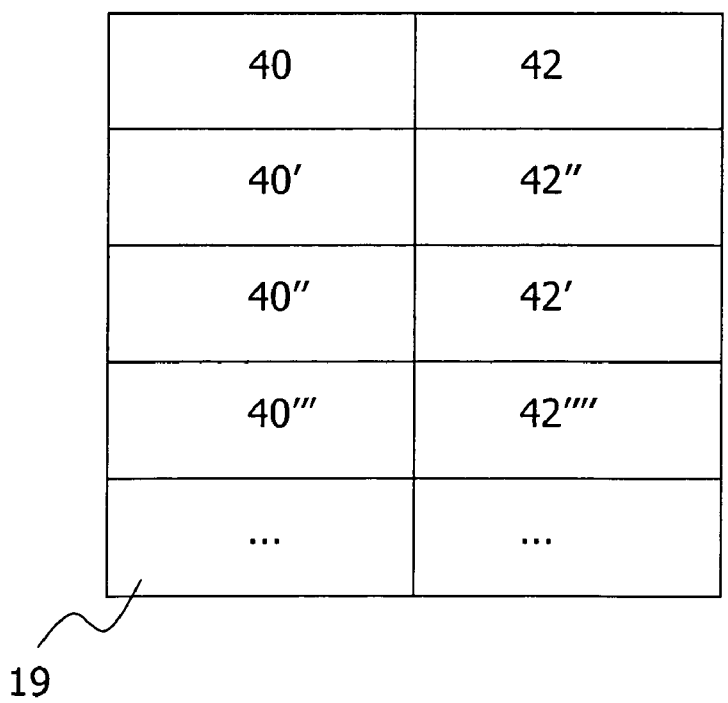
FIG. 6 shows an assignment approach used in the second embodiment.

The assignment table 19 shown in FIG. 6 is provided within the productive network 12 as a file. The assignment table 19 may be generated in various ways. Thus, one data record from the non-productive database 22 may be assigned to all the data records or a selection of the data records contained in the productive database 14 by randomization, that is to say on the basis of chance. The results of the randomization are then recorded in the assignment table 19. The fields of the assignment table may be filled with unambiguous or ambiguous identifiers of the individual data records, that is to say in the exemplary embodiment in accordance with FIG. 5, for example, with unambiguous data record numbers or ambiguous data elements such as surnames.

The assignment can be performed in such a way that a (retrospective) determination becomes possible of the data record or data element from the productive databases assigned to an anonymized data record or data element. For this purpose, the assignment table shown in FIG. 6 may, for example, comprise a further column into which the anonymized data record is written that is assigned to each combination of productive and non-productive data record. In the first column in the assignment table 19 in accordance with FIG. 6, the identifier of the data record 44 (cf. FIG. 5) would then have to be entered.

As became evident from the above description, the invention permits, in a simple way, the generation of anonymized data records from productive and non-productive data records. The anonymized data records are updated and/or overwritten on the basis of a reproducible mechanism in order to maintain the test data. The maintained test data increase the reliability of conclusions drawn from trial runs. Also, the reproducible assignment mechanism facilitates the error analysis, and, in particular, both in the development and test environment and in the productive environment.

Although the invention was described on the basis of a plurality of individual embodiments that can be combined with one another, numerous changes and modifications are conceivable. The invention can therefore be practised even deviating from the above exposition within the scope of the claims below.

The invention claimed is:

1. A method for the computer-aided generation of anonymized data records for developing and testing application programs that are intended for use in a productive environment, comprising the steps of:

providing at least one productive database containing data records that contain productive data elements to be anonymized;

providing at least one non-productive database containing data records that contain data elements;

generating a mutual assignment between data records of the nonproductive database and data records of the productive database, based on a respective record number as an unambiguous identifier of an individual record in the respective database wherein precisely one non-productive data record is assigned to each of the productive data records to be anonymized, and wherein the assignment is based on an assignment table that has been generated random-based, wherein the respective record number is stored in the assignment table and not in the anonymized data records; and generating anonymized data records by replacing the data elements to be anonymized in data records from the productive database with data elements of the respectively assigned data records from the nonproductive database, the assignment being maintained during at least one of a generation of new anonymized data records and an updating of the already generated anonymized data records.

2. The method according to claim 1, wherein the assignment permits a retrospective determination of the data element or data record from the productive database assigned to an anonymized data element or data record.

3. The method according to claim 1, wherein the assignment takes place within the productive environment.

4. The method according to claim 3, wherein the productive environment comprises a productive computer network containing a plurality of network components and in that access to the assignment is granted only to network components having a suitable authorization in the productive environment.

5. The method according to claim 3, wherein a non-productive environment is provided and no access is granted to the assignment from the non-productive environment.

6. The method according to claim 1, wherein the anonymized data records are updated at regular time intervals or under user control.

7. The method according to claim 1, wherein the data elements contained in the non-productive database have a meaning that can be comprehended by a user.

8. The method according to claim 1, wherein at least one of the data elements contained in the productive database and the data elements contained in the nonproductive database contain at least one of name data and address data.

9. The method according to claim 1, wherein the data elements in the nonproductive database were extracted from a publicly accessible database or file.

10. A computer program product comprising program code means for performing the method according to claim 1 when the computer program product is executed on one or more computers.

11. The computer program product according to claim 10, stored on a computer readable data medium.

12. A computer system for generating anonymized data records for developing and testing application programs that are intended for use in a productive environment, comprising:
- at least one productive database containing data records that contain productive data elements to be anonymized;
- at least one non-productive database containing data records that contain data elements;
- a computer for generating anonymized data records, a mutual assignment existing between data records of the non-productive database and data records of the productive database based on a respective number as an unambiguous identifier of an individual record in the respective database, wherein precisely one nonproductive data record is assigned to each of the productive data records to be anonymized, and wherein the assignment is based on an assignment table that has been generated random-based,
- wherein the respective record number is stored in the assignment table and not in the anonymized data records, and
- wherein the assignment is maintained during at least one of a generation of new anonymized data records and an updating of the already generated anonymized data records, and the computer generating an anonymized data record by replacing the data elements to be anonymized in a data record from the productive database by the data elements of an assigned data record from the non-productive database.

13. The method according to claim 1, wherein the data elements of the anonymized data records replaced during the generation of the anonymized data records have a meaning that is comprehendible by a user.

* * * * *